Dec. 21, 1926.
M. A. HEGERLAND
1,611,193
SLEIGH ATTACHMENT FOR MOTOR VEHICLES
Filed April 16, 1925
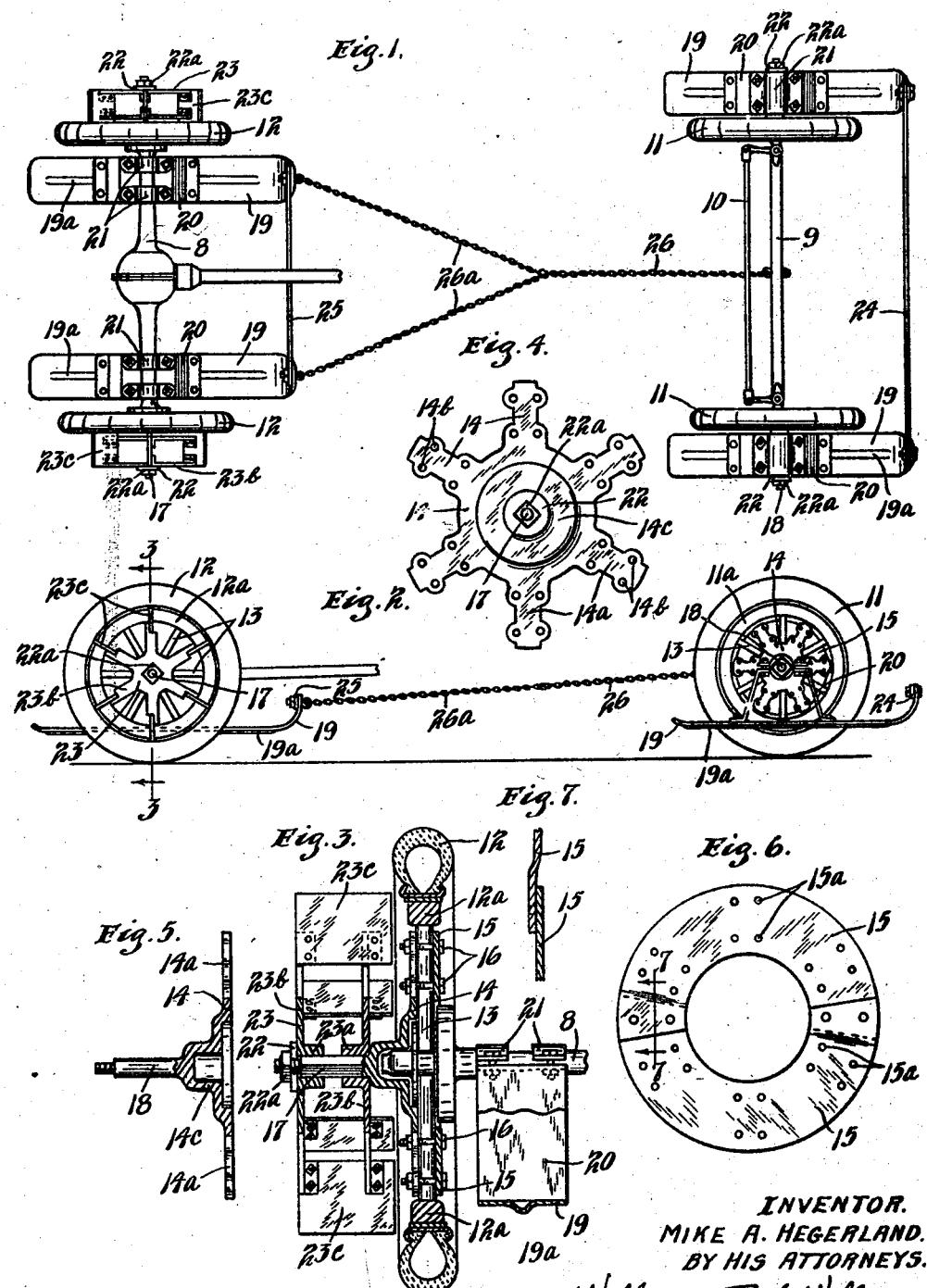
INVENTOR.
MIKE A. HEGERLAND.
BY HIS ATTORNEYS.

Patented Dec. 21, 1926.

1,611,193

UNITED STATES PATENT OFFICE.

MIKE A. HEGERLAND, OF WOODVILLE, WISCONSIN.

SLEIGH ATTACHMENT FOR MOTOR VEHICLES.

Application filed April 16, 1925. Serial No. 23,494.

This invention relates to a sleigh attachment adapted to be readily installed on a standard motor vehicle, providing suitable runners by which the vehicle may be supported on snow, and also driving means adapted to engage the snow and propel the vehicle therethrough.

It is an object of this invention to provide a simple but highly efficient sleigh attachment for standard motor vehicles which will convert a motor vehicle into an efficiently propelled sleigh, which attachment, when installed, will not interfere with the driving of the vehicle in the usual way on roads uncovered with snow, but which will afford runners and driving mechanism for a vehicle when the same is driven on a road having any considerable depth of snow thereover.

It is a more specific object of the invention to provide in such a device front and rear runners disposed at some distance above the normal ground engaging line of the wheels and driving members on the back wheel rigidly secured thereto and having their outer ground engaging edges disposed in circles concentric with the peripheral edges of the wheels or tires but extending approximately only to the fellies of said wheels. Thus, when the runners and driving members are installed, the motor vehicle may be driven over the roads without any interference from the runners or driving mechanism and may also be driven through heavy snow, whereupon the lower portions of the wheels will sink sufficiently in the snow to permit the runners and driving means to engage the same and support and propel the wheels therethrough.

It is a further object of the invention to provide means for securely attaching the front runners and driving means to the outer sides of the spokes of the wheels.

These and other objects of the invention will be apparent from the following description made in connection with the accompanying drawings, wherein like notations refer to similar parts throughout the several views, and in which—

Fig. 1 is a plan view of the chassis of a standard Ford automobile with some parts broken away and to which the preferred form of the invention is attached;

Fig. 2 is a side elevation of the same;

Fig. 3 is a cross section taken on the line 3—3 of Fig. 2;

Fig. 4 is a front elevation of one of the rear outer clamping plates detached;

Fig. 5 is a side elevation, with some parts broken away, of one of the front outer clamping plates detached;

Fig. 6 is a front elevation of one of the inner clamping plates detached; and

Fig. 7 is a fragmentary section taken on the line 7—7 of Fig. 6.

In the drawings, the sleigh attachment is illustrated installed on a standard Ford automobile, having the rear axle 8, the front axle 9, the tie rod 10 connecting the steering spindles, the front wheels 11, and the rear wheels 12. The spokes of all of the wheels are indicated by the numeral 13, and the fellies of the front and rear wheels by the numerals 11$^a$ and 12$^a$ respectively.

On the outer sides of the spokes 13 of each of the wheels a sprocket shaped clamping plate 14 is mounted, carrying a plurality of radially disposed arms 14$^a$, each of which is slightly wider than and adapted to fit over, one of the spokes 13. Radially spaced apertures 14$^b$ are provided in each of the arms 14$^a$, two of said apertures being disposed on either side of the spoke behind the arm. Clamping plates 14 are also provided with concavo-convex central portions or bosses 14$^c$ forming recesses in which the hubs of the wheels 11 and 12 are seated. Inner clamping plates, each comprising a pair of joined semi-annular members 15, are disposed on the inner sides of each of the wheels, fitting around the brake casings. These inner clamping plates are provided with a plurality of radially arranged apertures 15$^a$ adapted to be alined with apertures 14$^b$ on the outer clamping plates. Plates 14 and 15 are securely clamped together about the spokes 13 by means of a plurality of transverse nutted bolts 16 which pass through alined apertures 14$^b$ and 15$^a$.

The plates 14 on the rear wheels 12 carry rigidly therewith and projecting outwardly therefrom, the transverse horizontal stub shafts 17 preferably of rectangular cross section, while the outer plates 14 on the front wheels rigidly carry the transverse horizontal stub shafts 18 of circular cross section.

Runners are provided comprising the blades 19 having upturned front ends and provided on their bottom sides with the keels 19$^a$. Supporting means for runners 19 are provided in the form of inverted U- shaped brackets 20 secured to the top of the runners 19 and having at their top portions the caps or collars 21 bolted thereto. Two of these runners are secured to the stub shafts 18 on the front wheels, collars 21 being loosely clamped thereabout and the washer 22 being secured on the outer ends of shaft 18 by means of nuts 22ª which engage the threaded ends of said shafts. Another pair of the runners 19 are secured in similar manner to the rear axle 8 of the motor vehicle on the inner sides and adjacent the rear wheels 12 as best shown in Fig. 1. The supporting brackets 20 for the runners are of such height that the blades 19 will be disposed some distance from the normal ground engaging line of the wheels of the vehicle, preferably extending slightly above the lower peripheral edge of the fellies 12ª of the wheels.

Driving or propelling members are secured to each of the rear wheels comprising relatively narrow paddle wheels 23, having the central hubs 23ª of preferably rectangular cross section, the radial arms 23ᵇ rigidly carried by said hubs and the driving elements or projecting cleats 23ᶜ rigidly secured to the outer ends of arms 23ᵇ. The hubs 23ª fit over the shafts 17 and obviously are keyed thereto and secured thereon by means of the nuts 22ª which engage the threaded ends of the shafts 17. The outer edges of the projecting cleats 23ᶜ lie in the circumference of a circle concentric with the rear wheel and preferably approximately alined with the outer periphery of the rear fellies 12ª. It will be noticed that the circle in which said projecting cleats 23ª are inscribed extends slightly below the blade 19 of the rear runners so that these driving elements will engage the snow at the sides of the rear wheels 12.

A tie rod 24 is secured across the front upturned portions of the front runners 19 and a second tie rod 25 is secured across the upturned portions of the rear runners 19 and a chain or other flexible member 26 secured at its forward end to the front axle 9 and having the two diverging rear portions 26ª secured to the front ends of the runners, prevents said runners from swinging downward in interfering position when the vehicle is in motion.

From the above description, the operation of the device is probably obvious but may be briefly summarized as follows:

When the attachment is installed on a motor vehicle, the driving members 23 will obviously be rigidly secured to the spokes 13 of the rear wheels and consequently will rotate therewith, when the power is applied to the rear axle. The runners 19, disposed some distance above the normal ground line of the wheels, will support the vehicle when the same is moved through snow, the lower portions of the wheels sinking into the snow and up to the lower sides of the runners 19. The driving members or paddle wheels 23 will then project slightly below the blades 19 of the runners and will engage the snow at the sides of the rear wheels 12, propelling the vehicle.

It will be apparent that when the vehicle is driven on a hard road which is not covered by snow, even though the attachment is secured thereto, neither the runners nor the driving members will engage the ground and the vehicle may be driven in the usual way without any interference from the several parts of the attachment.

The runners are disposed sufficiently above the normal ground line of the wheels to be out of the way of small bumps or stones, while, of course, if snow-covered roads are traversed, the wheels will readily sink down to the level of the bottom of the runners 19, permitting the vehicle to be propelled in the manner above described. The front runners, while supported from the stub shafts 18, rigidly secured to the spokes 13 of the front wheels, are pivoted thereon, permitting the runners to be supported therefrom and also permitting the shafts 18 to rotate in the bearings formed at the top of the clamping caps or collars 21 when the vehicle is not supported from the runners.

It will, of course, be apparent that the inner clamping plates comprising the two semi-annular sections 15 may be readily attached and joined together about the brake casings contacting the inner sides of the spokes 13.

From the above description, it will be seen that a simple but highly efficient sleigh attachment has been invented for standard motor vehicles capable of being readily attached or detached to the same, and permitting the vehicle to be driven in the usual way over roads which are not encumbered by snow without interference from the attachment.

It will also be seen that highly efficient driving means have been provided in such a device, adapted to engage the snow at the outer sides of the rear wheels when the wheels have sunk into the snow or incrustation to a sufficient depth to permit the vehicle to be supported on the runners 19.

It will, of course, be understood that various changes may be made in the form, details, proportions and arrangement of parts without departing from the scope of the invention, which, generally stated, consists in a device capable of carrying out the objects above stated, such as shown and described and set forth in the appended claims.

What is claimed is:

1. The combination with a motor vehicle, of a sleigh attachment therefor comprising a plurality of runners mounted adjacent the wheels of said vehicle with their bottom edges disposed at some distance above the normal ground engaging line of the wheels and driving means for each of the back wheels of said vehicle comprising a member rigidly secured to the outer side of said wheel having circumferentially spaced projecting portions the outer ends of which lie in a circle extending slightly below the lower edge of the runner adjacent said wheel.

2. A sleigh attachment for the wheels of a motor vehicle having in combination a mounting for each wheel comprising a pair of plates clamped together about the spokes of a wheel and axially alined therewith, and an outwardly projecting pin on the outer plate, a pair of runners adapted to be mounted on the front wheels, a runner mounted on the rear axle housing adjacent each of said wheels, and driving mechanism attached to the mounting on each of the rear wheels comprising a frame having a hub adapted to be rigidly secured to said projecting pin and a plurality of radially disposed driving elements carried by said frame and adapted to project below the bottom of the adjacent runner.

In testimony whereof I affix my signature.

MIKE A. HEGERLAND.